Figure 1:
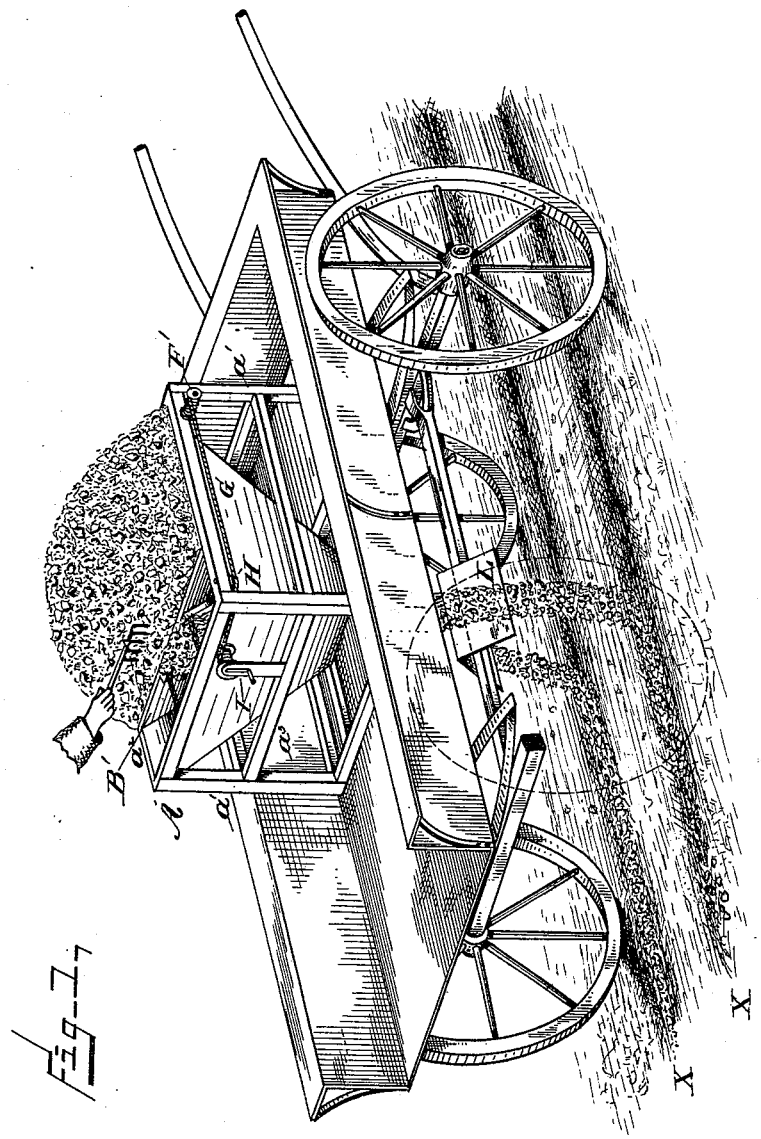

(No Model.) 2 Sheets—Sheet 1.

E. P. JOHNSTON.
FERTILIZER DISTRIBUTER.

No. 394,369. Patented Dec. 11, 1888.

Witnesses.
Morris A. Clark.
Jos. C. Ringwalt. Jr.

Inventor.
Edward P. Johnston,
By his Attorneys

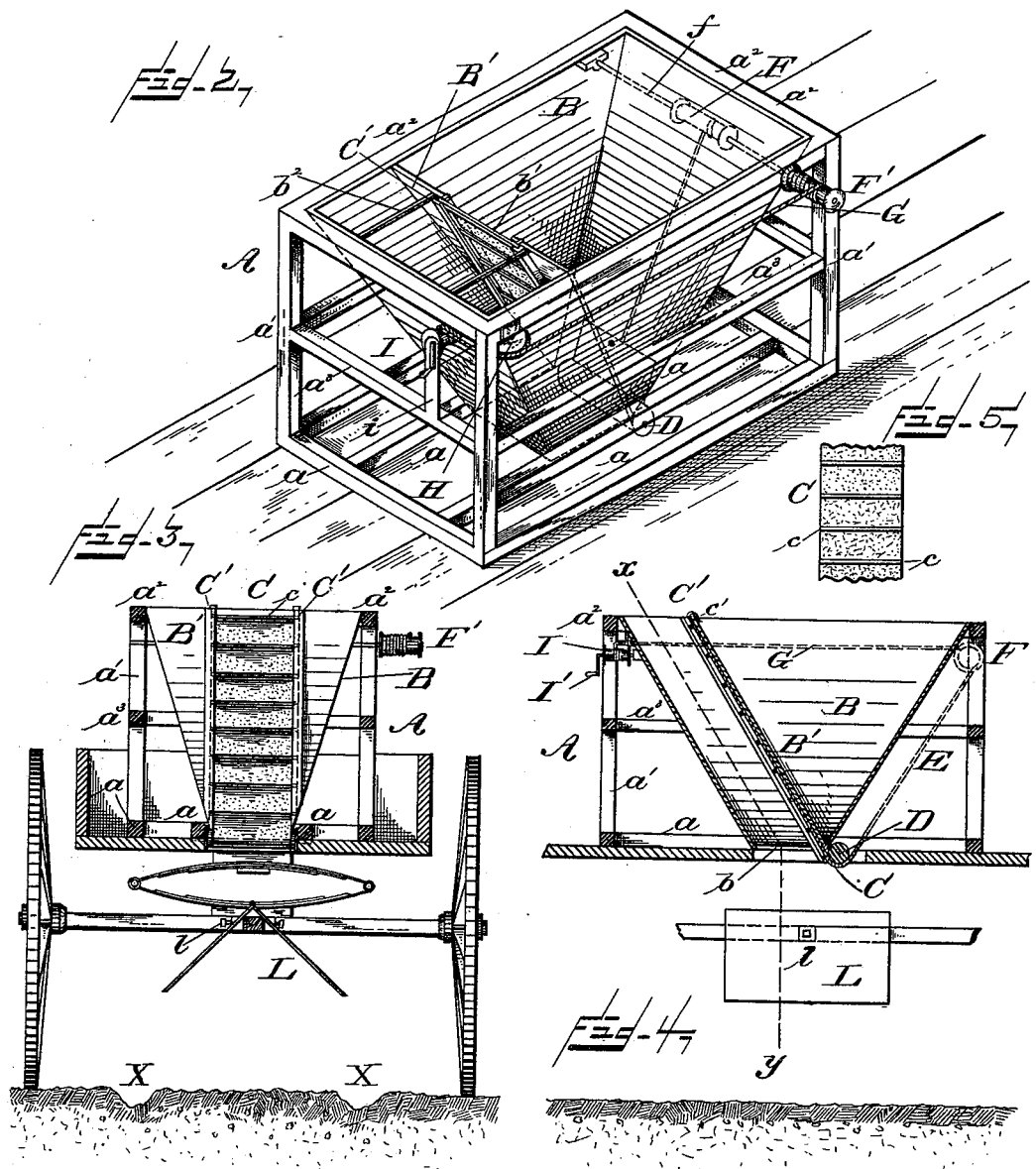

UNITED STATES PATENT OFFICE.

EDWARD P. JOHNSTON, OF WASHINGTON, DISTRICT OF COLUMBIA.

FERTILIZER-DISTRIBUTER.

SPECIFICATION forming part of Letters Patent No. 394,369, dated December 11, 1888.

Application filed August 17, 1888. Serial No. 282,957. (No model.)

*To all whom it may concern:*

Be it known that I, EDWARD P. JOHNSTON, a citizen of the United States, residing at Washington, in the District of Columbia, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to fertilizer-distributers; and its object is to enable the fertilizing material to be distributed quickly, accurately, and economically by means of an inexpensive apparatus.

The invention consists of a suitable hopper having a false side or partition dividing it into two compartments, one of which is preferably smaller than the other. One of the compartments has a hole in its bottom, and in the partition is an opening controlled by a gate or valve to permit the fertilizing material to escape from the other compartment and drop through the hole to the ground.

The invention also consists of certain other details and arrangements of parts, hereinafter set forth, and particularly pointed out in the claims.

In the drawings, Figure 1 is a perspective view of a wagon containing the apparatus. Fig. 2 is a perspective view of the apparatus on an enlarged scale. Fig. 3 is a cross-section on line $x\ y$, Fig. 4. Fig. 4 is a central longitudinal section, and Fig. 5 is a detail.

The same letters refer to the same parts in all the figures.

The apparatus is intended to be transported across a field in line with the furrows or rows of hills that are to receive the fertilizer. It may be carried in a wagon or mounted on wheels of its own. In the former case one of the bottom boards of the wagon is removed to allow the fertilizer to drop through.

The frame A is composed of sills $a$, posts $a'$, and top rails, $a^2$. It may be strengthened by suitable cross-pieces, $a^3$. Fastened to the inside of the top rails are the sides of the hopper B, which converge toward the bottom, leaving a hole, $b$, about a foot square between their lower ends, where they are fastened to the sills $a\ a$. A false side or partition, B', is inserted near to and parallel with one side of the hopper, thus dividing it into two compartments. The lower edge of the partition B' meets the opposite side of the hopper where the latter rests upon the sills $a\ a$, thereby preventing any direct communication between the larger compartment of the hopper and the hole $b$. An opening, $b'$, extends from the top to the bottom of the partition B' of a width somewhat less than the hole $b$. The portions of the partition lying on either side of this opening $b'$ are braced by bars $b^2$.

A movable gate or valve normally closes the opening $b'$. I prefer to construct this valve as follows: Along each edge of the opening $b'$, and on that side of the partition B' next to the wall of the hopper B, is a guide, C', consisting of a grooved or rabbeted bar of wood or a suitably-flanged strip of metal. A band of flexible material, C—such as stout canvas—is fitted to the guides, being wide enough to lie snugly in the grooves without wrinkling. To stiffen the canvas, a series of transverse battens, $c$, are fastened to it, the ends of which are received in the guides C'. At the upper end of the band C is a hook, $c'$, or other fastening device to hold it from sliding downward. The lower end of the band passes under a roller, D, mounted in bearings under the hopper on the same side of the opening $b$ as the partitions B'. A chain or cord, E, is attached to the end of the band C and runs up along the outside of the hopper to a drum, F, mounted on a shaft, $f$, which extends across the apparatus just beneath the top rail, $a^2$, by which it is supported in suitable bearings. On the outer end of the shaft, and outside of the frame A, is another drum, F', on which is wound a cord or chain, G, which passes around a pulley, H, at the other end of the frame, and is attached to a drum, I, mounted in bearings $i$ and provided with a crank-handle, I'.

It will be seen that upon releasing the fastenings $c'$ and turning the handle I' the cord G will be wound upon the drum I, thereby revolving the shaft $f$ and winding the cord E upon the drum F, and thus drawing the band C downward in its guides C'. This gradually uncovers the opening b' in the partition B'. The person operating the device is stationed at the rear of the apparatus on the same side as the partition B' and the crank-handle I'. With a short-handled rake or other suitable instrument he pulls the fertilizer from the hopper out through the opening b', allowing it to fall upon the inclined side B of the hopper, down which it slides to the hole b and thence falls to the ground.

In case it is desired to treat two furrows at the same time, a deflector, L, is clamped upon the reach of the wagon by set-screws l, or in any other convenient manner. The deflector consists of two plates united along one edge at an angle, and forming a shield to cover the wagon-reach under the hole b. The plates extend sufficiently far on each side to cause the fertilizer falling upon them to be discharged into the furrows X. To adapt it to differently-spaced furrows, the plates may be hinged together and have some means of adjusting them to a greater or less angle. The hopper is so arranged that the fertilizer falling from the hole b will be equally divided by the deflector, half of it being diverted to one side and half to the other.

Having thus described my invention, what I claim, and desire to secure by Letters Patent, is—

1. A fertilizer-distributer consisting of a hopper having a partition dividing it into two compartments, said partition meeting one side of the hopper at its lower end and leaving an opening for the discharge of the fertilizing material between its lower end and the other side of the hopper, and having an opening extending from top to bottom controlled by a suitable gate or valve, substantially as set forth.

2. A fertilizer-distributer consisting of a hopper, B, having the partition B', parallel with one side of the hopper and provided with the opening b', controlled by the sliding gate C, the hopper also having an opening, b, between the lower edge of the partition B' and that side of the hopper parallel thereto, substantially as set forth.

3. The combination, with the hopper B, having the partition B', provided with the opening b', of the sliding band C, guides C' for the same, and means for moving the band in the guides, substantially as and for the purpose set forth.

4. In a fertilizer-distributer, the combination, with a hopper having a partition provided with an opening controlled by a movable gate and arranged parallel with an outer inclined side of the hopper, and affording an opening between its lower edge and the lower edge of the inclined side, of a deflector secured beneath the opening, substantially as set forth.

5. The combination, with the hopper B, having the partition B', provided with the opening b', of the flexible band C, the batten c for stiffening the same, the roller D, under which the band passes, the cord E, attached to the band, the drum F, on which the cord E is wound, and means for revolving the drum, substantially as and for the purpose set forth.

In testimony whereof I affix my signature in presence of two witnesses.

EDWARD P. JOHNSTON.

Witnesses:
G. W. BALLOCH,
W. HENRY WALKER.